US012159980B2

(12) United States Patent
Hammond et al.

(10) Patent No.: US 12,159,980 B2
(45) Date of Patent: Dec. 3, 2024

(54) PRECISION BATTERY GRID PELLET ADHESION/COHESION STRENGTH TESTER

(71) Applicant: The United States of America, as represented by the Secretary of the Navy, Crane, IN (US)

(72) Inventors: Christopher J. Hammond, Bloomington, IN (US); Alexander M. Potter, Bloomington, IN (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 415 days.

(21) Appl. No.: 17/747,267

(22) Filed: May 18, 2022

(65) Prior Publication Data

US 2022/0376315 A1 Nov. 24, 2022

Related U.S. Application Data

(60) Provisional application No. 63/189,882, filed on May 18, 2021.

(51) Int. Cl.
*G01N 19/04* (2006.01)
*H01M 10/42* (2006.01)

(52) U.S. Cl.
CPC ........ *H01M 10/4285* (2013.01); *G01N 19/04* (2013.01)

(58) Field of Classification Search
CPC .... H01M 10/4285; H01M 4/14; G01N 19/04; Y02E 60/10
See application file for complete search history.

(56) References Cited

U.S. PATENT DOCUMENTS

| 11,385,112 | B2* | 7/2022 | Mori | H01M 10/4285 |
|---|---|---|---|---|
| 11,543,315 | B2* | 1/2023 | Mori | H01M 10/0525 |
| 2020/0166422 | A1* | 5/2020 | Mori | H01M 50/24 |
| 2022/0268652 | A1* | 8/2022 | Mori | H01M 50/213 |
| 2023/0003808 | A1* | 1/2023 | Chen | G01R 31/36 |
| 2023/0204480 | A1* | 6/2023 | Park | H01M 10/4285 |
| | | | | 73/827 |
| 2023/0296676 | A1* | 9/2023 | Brecht | G01B 5/30 |
| | | | | 429/90 |
| 2023/0393044 | A1* | 12/2023 | Gilli | G01N 3/08 |
| 2024/0106014 | A1* | 3/2024 | Liao | G01L 5/0061 |
| 2024/0255376 | A1* | 8/2024 | Han | H01M 10/4285 |

* cited by examiner

*Primary Examiner* — Freddie Kirkland, III
(74) *Attorney, Agent, or Firm* — Naval Surface Warfare Center, Crane Division; Christopher Feigenbutz

(57) ABSTRACT

Provided is a battery grid pellet adhesion/cohesion strength tester that can accurately determine the push-out strength of a battery grid pellet by measuring the binding of the active material to the battery grid during the pasting and curing process. A programmable test stand and force gage are used with a selectable active material punching tool fixture and a set of selectable set of grid location pins. Active material from a lead-acid battery is forced out of the battery grid at a programmed feed rate with the force gage reporting precise force measurements for each battery grid pellets adhesion/cohesion strength. The inventive device can be utilized as a quality control measure following the battery pasting and curing process, which will ensure that consistent and uniform adhesion/cohesion has occurred during battery manufacture, thereby avoiding battery premature performance failure.

13 Claims, 4 Drawing Sheets

PRECISION BATTERY GRID PELLET ADHESION/COHESION STRENGTH TESTER

CROSS-REFERENCE TO RELATED APPLICATIONS

The present application claims priority to U.S. Provisional Patent Application Ser. No. 63/189,882, filed May 18 2021, entitled "PRECISION BATTERY GRID PELLET ADHESION/COHESION STRENGTH TESTER," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200382US02) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE INVENTION

The field of invention relates generally to batteries. More particularly, it pertains to a battery grid pellet adhesion/cohesion strength tester that can accurately determine the push-out strength of a battery grid pellet by measuring the binding of the PAM and NAM to the battery grid that occurs during the pasting and curing process.

BACKGROUND

The lead-acid battery was invented in 1859 by French physicist Gaston Planté. Lead-acid batteries includes a positive plate made up of lead dioxide and a negative plate of pure lead. The electric potential between the plates is 2 volts when are immersed in dilute sulfuric acid. As such, a 12-volt lead acid battery comprises six cells that are connected in series and enclosed in a casing. Lead-acid batteries are the first rechargeable battery ever created. Compared to more modern rechargeable batteries that use nickel, lithium, and other elements, lead-acid batteries have low energy density. Lead-acid batteries, however, can supply high surge currents, which means that their cells have a large power-to-weight ratio. The power-to-weight ratio and relative low cost make them an excellent solution for use in motor vehicles, where a high current is required to start an engine.

The manufacturing of lead-acid batteries can be divided into several stages, including oxide and grid production, pasting and curing, assembly, formation, filling, charge-discharge, and final assembly. One of the most critical parts of manufacturing is the pasting and curing process. The paste material generally comprises an oxide of lead, red lead, litharge, water and sulfuric acid, however, the actual composition is often a trade secret. The pastes are used to fill the active material in the positive and negative grids, called Positive Active Material (PAM) and Negative Active Material (NAM) respectively.

The cycle life of a lead-acid battery is dramatically shortened by a process identified as "premature capacity loss" (PCL), which is directly related to the pasting and curing process. It has been established that PCL is a result of changes in the structure and electrical properties of a batteries corrosion layer during cycling. Analysis of failed batteries has shown that low push-out strength is a root cause indicator for battery premature performance failure. This is caused by manufacturing variations, particularly poor binding of the PAM and NAM to the battery grid during the pasting and curing process is known to be a root cause of premature performance failure. One of the primary methods identified to suppress PCL is to increase the binding between the grid and PAM during the production process through the formation of a thick corrosion layer using high temperature curing of the positive plates. A battery grids pellet adhesion/cohesion strength (push-out strength) provides information related to the binding.

There is no existing method of testing to accurately determine the adhesion/cohesion during or following the battery grid pasting and curing process. Typical quality control testing of battery grids following pasting and curing includes determining the paste density, a paste temperature check, and the pasted plate weight and moisture percentage. These tests, however, do not measure the push-out strength (degree of binding) of a battery grid pellet in a precise, repeatable fashion. Other options include battery dissection using plier handles to push on pellet/grid of the battery while it was placed on a weight scale, wherein the operator attempts to read the maximum reading and record. This method, however, is not repeatable and is unreliable.

SUMMARY OF THE INVENTION

The present invention relates to a battery grid pellet adhesion/cohesion strength tester that can accurately determine the push-out strength of a battery grid pellet by measuring the binding of the PAM and NAM to the battery grid that occurs during the pasting and curing process. The inventive device utilizes a programmable test stand and force gage combined with a selectable active material punching tool fixture and a set of selectable set of grid location pins. Positive Active Material (PAM) and/or Negative Active Material (NAM) from a lead-acid battery is forced out of the battery grid at a programmed feed rate with the force gage reporting precise force measurements for each battery grid pellets adhesion/cohesion strength (e.g. push-out strength). The inventive device can be utilized to determine the push-out strength values as a quality control measure following the battery pasting and curing process, which will ensure that consistent and uniform adhesion/cohesion has occurred during battery manufacture and avoid battery premature performance failure. Additionally, the inventive device can be utilized as part of a battery production process quality-control protocol.

According to an illustrative embodiment of the present disclosure, it is an object of the invention to provide a battery grid pellet adhesion/cohesion strength tester that has all of the advantages of the prior art and none of the disadvantages.

According to a further illustrative embodiment of the present disclosure, it is an object of the invention to provide a battery grid pellet adhesion/cohesion strength tester that can accurately determine the push-out strength of a battery grid pellet by measuring the binding of the PAM and NAM to the battery grid that occurs during the pasting and curing process.

According to a yet another illustrative embodiment of the present disclosure, it is an object of the invention to a battery grid pellet adhesion/cohesion strength tester that can serve as a quality control measure following the battery pasting and curing process.

According to a still another illustrative embodiment of the present disclosure, it is an object of the invention to a battery grid pellet adhesion/cohesion strength tester that ensures that consistent and uniform adhesion/cohesion has occurred during battery manufacture, which will prevent battery premature performance failure.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Generally, provided is sample testing apparatus for a battery plate. The adhesion/cohesion strength of the battery grid can be tested on either the positive plate or negative plate. Adhesion/cohesion strength (or pellet strength) is an aggregate representative measurement of Positive Active Material (PAM)/Negative Active Material (NAM) cohesion strength and the grid adhesion strength. This sample testing apparatus described herein allows for precise repeatable results of these measurements.

In an illustrative embodiment, provided is a sample testing apparatus for a battery plate comprising active material and a grid, the apparatus comprising: a programmable test stand; a force gage comprising a selectable active material punching tool; a selectable set of grid location pins, and a removable sample tray. The selectable active material punching tool is selected to contact the active material of the battery and not the grid. The grid location pins are selected to align with and making contact with the grid and not the active material of the battery. The force gage applies force to the active material punching tool to push the active material out of the battery grid at a programmed feed rate and the force is recorded.

In an illustrative embodiment, provided is an apparatus for testing a battery plate with a programmable test stand and a force gage, the battery plate comprising active material and a grid, the apparatus comprising a selectable active material punching tool, a selectable set of grid location pins, and a removable sample tray. The selectable active material punching tool is selected to contact the active material of the battery and not the grid. The grid location pins are selected to align with and making contact with the grid and not the active material of the battery. The active material punching tool pushes the active material out of the battery grid at a programmed feed rate and the force required to push said active material out of said battery grid is recorded.

Figure 1:
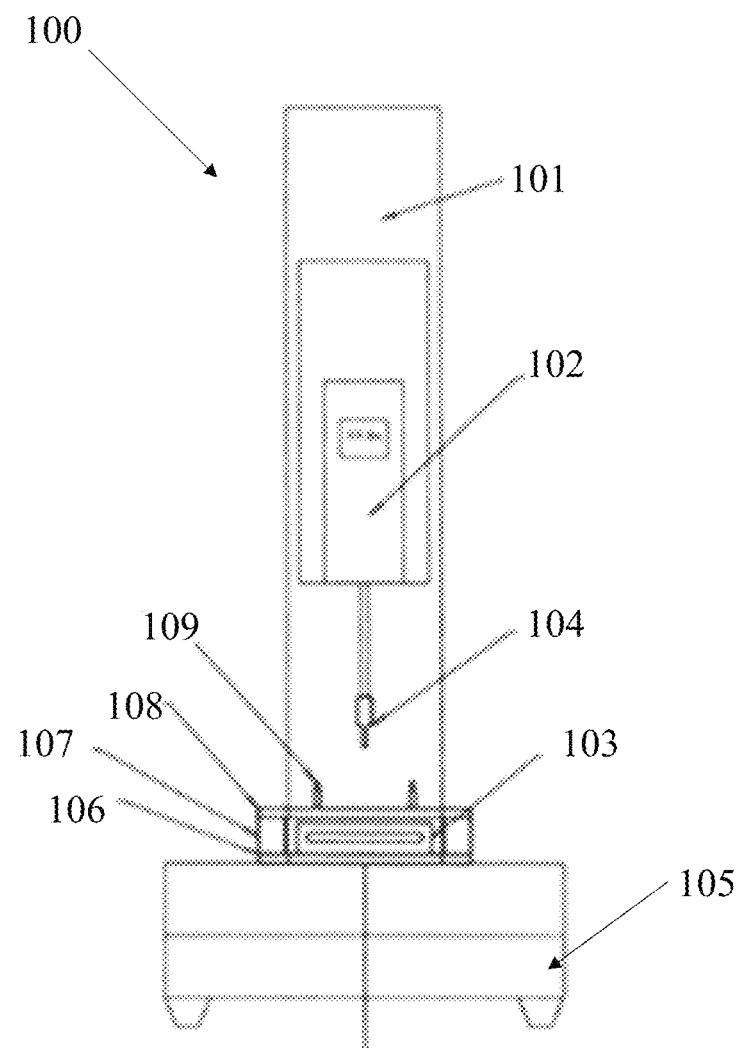
FIG. 1 shows a view of the precision battery grid pellet adhesion/cohesion strength tester.
Figure 2:
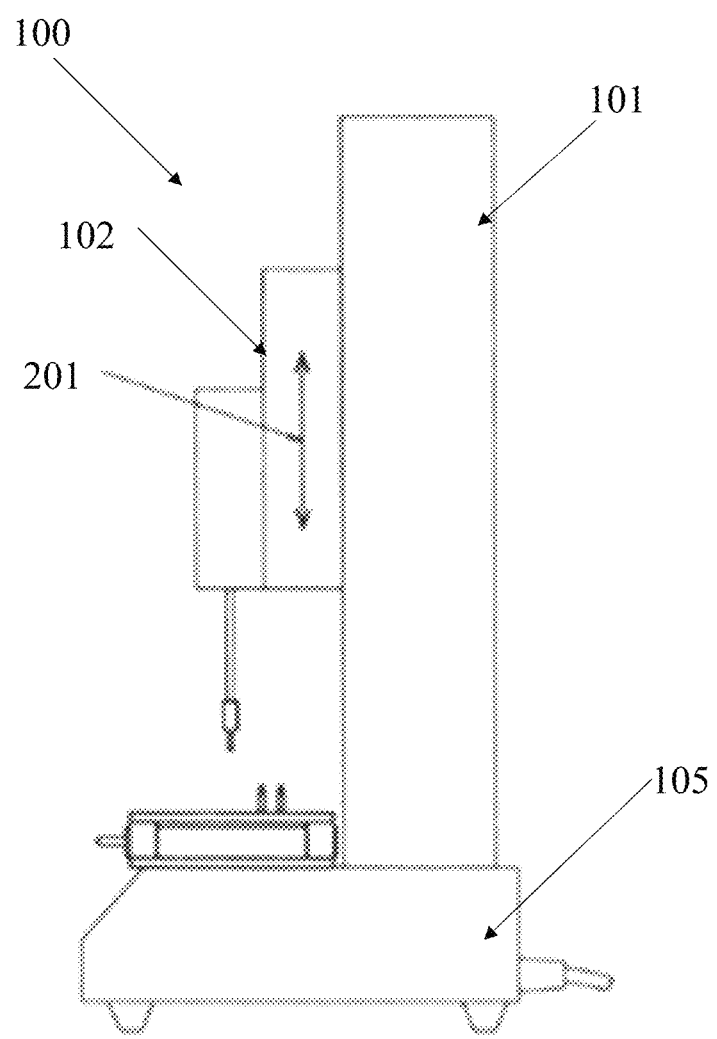
FIG. 2 shows a side view of the precision battery grid pellet adhesion/cohesion strength tester

FIGS. 1 and 2 show views of the precision battery grid pellet adhesion/cohesion strength tester 100. The device comprises a precision motorized programmable test stand 101, a force gage 102, and a removable sample tray 103. The force gage 102 further includes a selectable active material punching tool 104. In an illustrative embodiment, the selectable active material punching tool 104 is interchangeable for batteries from different manufacturers. In an illustrative embodiment, the selectable active material punching tool 104 is vendor specific. Contained on the base 105 of the test stand 100 is a lower plate 106, a riser 107, and an upper plate 108 with a set of selectable set of grid location pins 109 located thereon. In an illustrative embodiment, the selectable set of grid location pins 109 is interchangeable for batteries from different manufacturers. In an illustrative embodiment, the selectable set of grid location pins 109 is vendor specific.

The precision motorized programmable test stand 101 is well understood in the art and can be used in conjunction with the force gauge 102 for force measurements and for the testing of compressive and tensile forces with different materials. In an illustrative embodiment, as used herein the test stand 101 and force gage 102 can measure the force of the active material in a battery. In an illustrative embodiment the active material comprises PAM and/or NAM in a battery. The force gage 102 includes a selectable and interchangeable vendor specific punching tool 104 for batteries from different manufacturers. Below the force gage 102 is a selectable set of grid location pins 109 affixed to the upper plate 108, which will be discussed in greater detail below.

Figure 3:
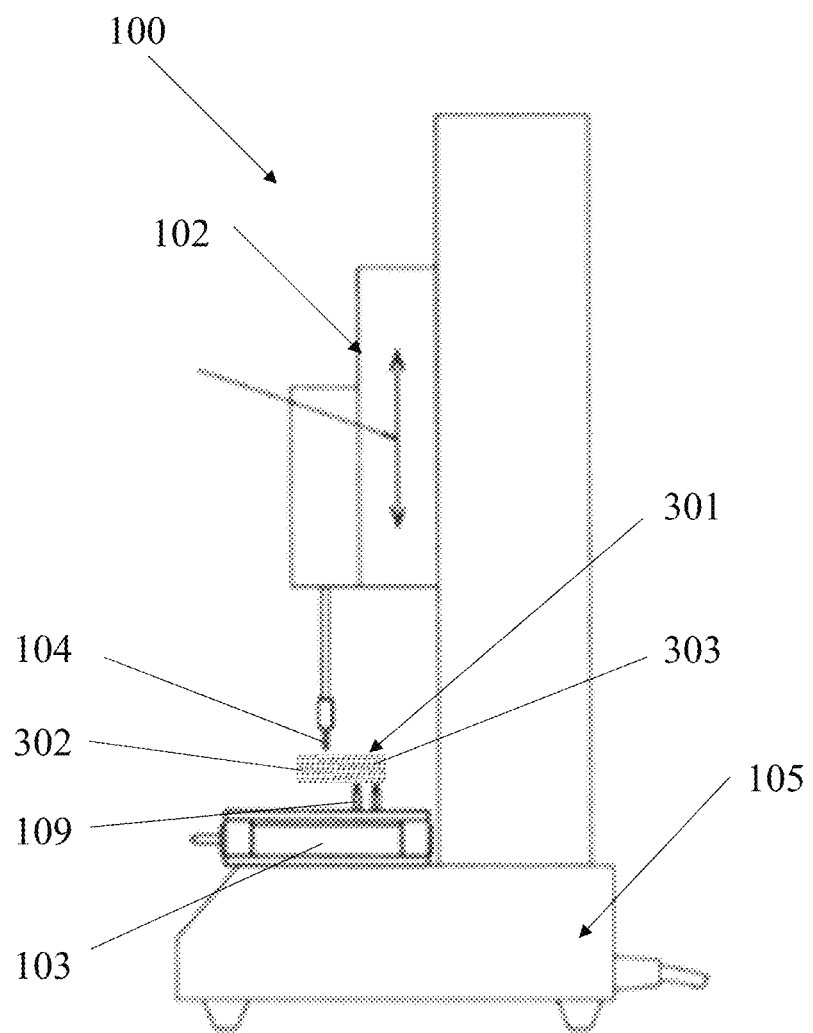
FIG. 3 shows a side view of the precision battery grid pellet adhesion/cohesion strength tester and a plate sample section.

FIG. 3 shows a side view of the precision battery grid pellet adhesion/cohesion strength tester 100 and a plate sample section 301. A plate sample section 301 of approximately four square inches is cut and inserted onto the grid location pins 109. The grid location pins 109 locate the grid center along the same axis as the selectable active material punching tool 104 and force gage 102. In an illustrative embodiment, the grid location pins 109 support the plate sample section 301 by aligning and making contact with the grid 303 and not the active material (PAM/NAM) 302. The interchangeable selectable active material punching tool 104 makes contact with the active material 302 and not the grid 303. In this way, when the force gage 102 is activated, the selectable active material punching tool 104 measures the force required to force the active material 302 out of the grid 303 at a programmed feed rate by the force gage 102. The sample tray 103 collects the active material 302 after it is forced out of the grid 303. The test stand 101 is programmed to a specific feed rate and the force gage 102 automatically captures the highest reading. All PAM/NAM 302 material pushed out is captured in the removable sample tray 103 located in the base 105.

In an alternate embodiment, the inventive device can is a stand-alone apparatus for use with an existing precision motorized programmable test stand and force gage. In an illustrative embodiment, the stand-alone apparatus comprises a selectable active material punching tool 104, a selectable set of grid location pins 109, and a removable sample tray 103. As described above, the selectable active material punching tool 104 is selected to contact the active material 302 of the battery and not the grid 303, while the grid location pins 109 are selected to align with and making contact with the grid 303 and not the active material 302 of the battery. The active material punching tool 104 is used to push the active material 302 out of the battery grid 303 at a programmed feed rate. The force required to push the active material 302 out of the battery grid 303 is recorded.

Figure 4:
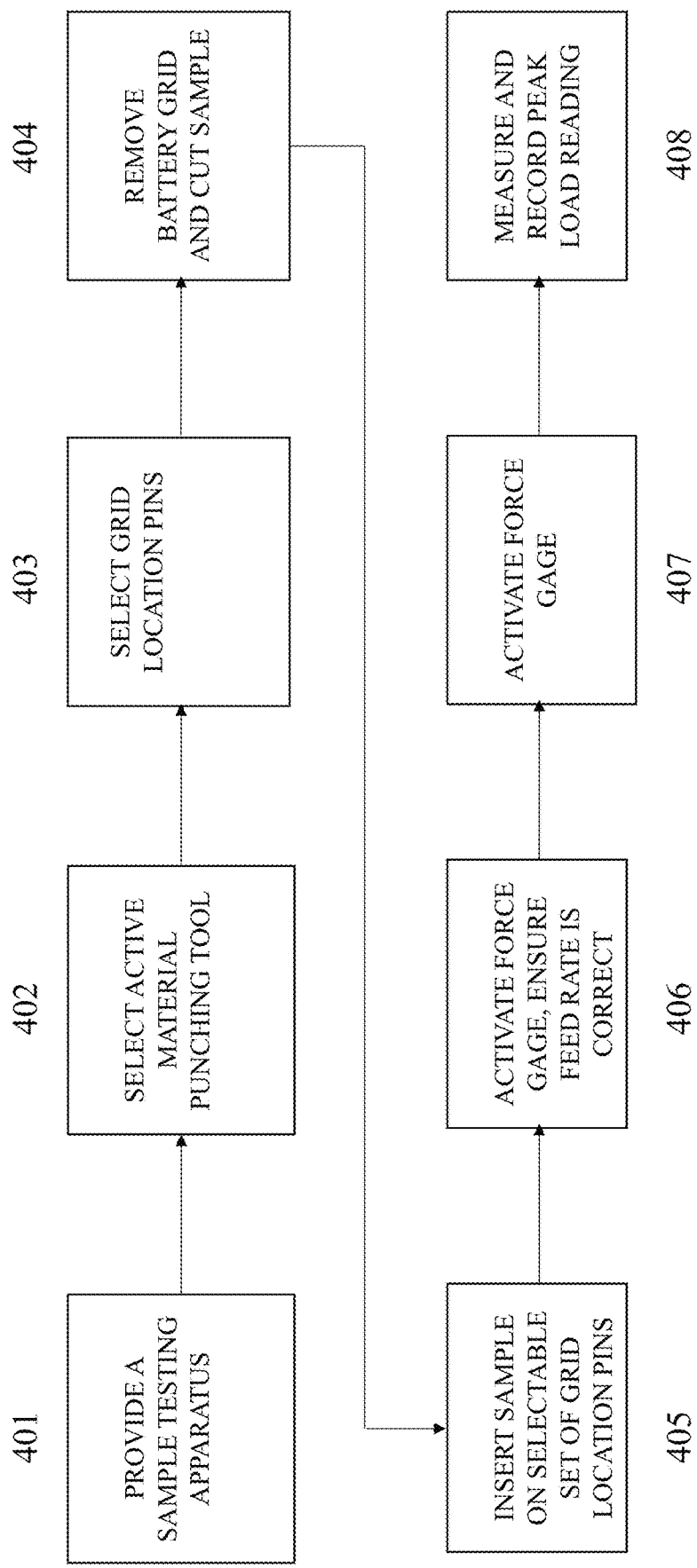
FIG. 4 shows a flow chart of the measurement method.

FIG. 4 shows a flow chart of the measurement method. The first step in the method at 401 involves providing a sample testing apparatus. In one illustrative embodiment, the apparatus comprises a programmable test stand, a force gage comprising a selectable active material punching tool, a selectable set of grid location pins, and a removable sample tray. At 402, the selectable active material punching tool is selected to contact the active material of the battery and not the grid. At 403, the grid location pins are selected to align with and making contact with the grid and not the active material of the battery. At 404, the battery grid is removed from the battery and a sample is cut from the battery grid plate. At 405, insert the sample on the selectable set of grid location pins. At 406, activate the force gage, ensure feed rate is correct and zero the force gauge. At 407, activate the force gage, which applies force to the active material punching tool to push the active material out of the battery grid at a programmed feed rate. At 408, measure and record peak load reading.

The present invention can be used with any grid/paste produced battery design process with customization of grid locator pins and also the punch tooling. Feed rates are completely programmable and can be tailored to the specific battery vendor and chemistry being tested.

Although the invention has been described in detail with reference to certain preferred embodiments, variations and modifications exist within the spirit and scope of the invention as described and defined in the following claims.

The invention claimed is:

1. A battery adhesion/cohesion strength tester apparatus that measures the push-out strength of a battery plate comprising active material and a grid, said apparatus comprising:
   a programmable test stand;
   a force gage comprising a selectable active material punching tool;
   a selectable set of grid location pins; and
   a removable sample tray;
   wherein, said selectable active material punching tool is selected to contact said active material of said battery and not said grid;
   wherein said grid location pins are selected to align with and making contact with said grid and not said active material of said battery;
   wherein said force gage applies force to said selectable active material punching tool to push said active material out of said battery grid at a programmed feed rate and;
   wherein said force is recorded.

2. The apparatus of claim 1, wherein said active material is Positive Active Material.

3. The apparatus of claim 1, wherein said active material is Negative Active Material.

4. The apparatus of claim 1, wherein said selectable active material punching tool is selected based on the configuration of said battery to be tested.

5. The apparatus of claim 1, wherein said selectable set of grid location pins is selected based on the configuration of said battery to be tested.

6. The apparatus of claim 1, wherein said force gage captures said force applied to said battery grid.

7. The apparatus of claim 6, wherein said force gage captures said peak load reading applied to said battery grid.

8. An apparatus for testing a battery plate with a programmable test stand and a force gage, said battery plate comprising active material and a grid, said apparatus comprising:
   a selectable active material punching tool;
   a selectable set of grid location pins; and
   a removable sample tray;
   wherein, said selectable active material punching tool is selected to contact said active material of said battery and not said grid;
   wherein said grid location pins are selected to align with and making contact with said grid and not said active material of said battery;
   wherein said active material punching tool pushes said active material out of said battery grid at a programmed feed rate and;
   wherein force required to push said active material out of said battery grid is recorded.

9. The apparatus of claim 8, wherein said active material is Positive Active Material.

10. The apparatus of claim 8, wherein said active material is Negative Active Material.

11. The apparatus of claim 8, wherein said selectable active material punching tool is selected based on the configuration of said battery to be tested.

12. The apparatus of claim 8, wherein said selectable set of grid location pins is selected based on the configuration of said battery to be tested.

13. A method of testing battery grid pellet adhesion/cohesion strength comprising:
   providing a sample testing apparatus for a battery plate comprising active material and a grid, said apparatus comprising:
   a programmable test stand;
   a force gage comprising a selectable active material punching tool;
   a selectable set of grid location pins; and
   a removable sample tray;
   wherein, said selectable active material punching tool is selected to contact said active material of said battery and not said grid;
   wherein said grid location pins are selected to align with and making contact with said grid and not said active material of said battery;
   removing said battery grid from said battery;
   cutting a sample from said battery grid plate;
   insert said sample on said selectable set of grid location pins;
   activate said force gage, ensure feed rate is correct and zero said force gauge;
   activate said force gage, which applies force to said active material punching tool to push said active material out of said battery grid at a programmed feed rate and;
   measure and record peak load reading.

* * * * *